(12) United States Patent
Shetty et al.

(10) Patent No.: US 12,610,219 B2
(45) Date of Patent: Apr. 21, 2026

(54) SCRUBBING FOR EDGE BASED COMMUNICATION OF COMMERCIAL COMMUNICATIONS

(71) Applicant: INTERNATIONAL BUSINESS MACHINES CORPORATION, Armonk, NY (US)

(72) Inventors: Shilpa Shetty, Sydney (AU); Jignesh Karia, Thane (IN); Mukundan Sundararajan, Bangalore (IN); Pankaj Satyanarayan Dayama, Bangalore (IN); Neha Shah, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 376 days.

(21) Appl. No.: 18/319,009

(22) Filed: May 17, 2023

(65) Prior Publication Data

US 2024/0388878 A1 Nov. 21, 2024

(51) Int. Cl.
 *H04W 4/23* (2018.01)
 *H04W 4/021* (2018.01)

(52) U.S. Cl.
 CPC ............. *H04W 4/23* (2018.02); *H04W 4/021* (2013.01)

(58) Field of Classification Search
 CPC ......... H04W 4/029; H04W 4/35; H04W 4/70; H04W 4/80; H04W 84/045; H04W 88/08;
 (Continued)

(56) References Cited

U.S. PATENT DOCUMENTS 8,666,376 B2 3/2014 Ramer et al.
8,831,642 B2 * 9/2014 Moldavsky ........... H04W 8/005
 455/414.3
(Continued)

FOREIGN PATENT DOCUMENTS

EP 2378436 A1 10/2011
EP 4029216 A1 7/2022
WO 2024/235639 A1 11/2024

OTHER PUBLICATIONS

WIPO Appln. No. PCT/EP2024/061987, Notification of Transmittal of the International Search Report and the Written Opinion of the International Searching Authority, Jul. 1, 20246, 13 pg.
(Continued)

*Primary Examiner* — Diane D Mizrahi
*Assistant Examiner* — Jing Gao
(74) *Attorney, Agent, or Firm* — CHIP LAW GROUP

(57) ABSTRACT

An edge device can receive a commercial communication, a scrubbed token list and a telephone number list. Responsive to determining the mobile device is detected in the specific area, whether a telephone number of the mobile device is contained in the telephone number list can be determined. Responsive to determining that the telephone number of the mobile device is contained in the telephone number list, the telephone number of the mobile device, the scrubbed token list and the commercial communication can be communicated to an originating access provider, wherein the originating access provider communicates to the mobile device the commercial communication based, at least in part, upon whether the telephone number of the mobile device matches a token contained in the scrubbed token list.

20 Claims, 5 Drawing Sheets

(58) Field of Classification Search

CPC ....... H04W 88/02; H04W 4/02; H04W 64/00; H04W 4/14; H04W 48/04; H04W 8/20; H04W 4/027; H04W 36/322; H04W 8/24; H04W 36/0007; H04W 92/12; H04W 92/20; H04W 12/069; H04W 12/63; H04W 12/64; H04W 4/21; H04W 28/0226; H04W 36/32; G16Y 20/10; Y02D 30/70; H04L 67/52; H04L 67/141; H04L 67/60; G06Q 30/02; G06Q 30/0261; G06Q 30/0222; G06Q 10/0833; G06Q 30/00; G06Q 30/0201; H04M 3/42059

See application file for complete search history.

(56) References Cited

U.S. PATENT DOCUMENTS

| | | |
|---|---|---|
| 8,914,902 B2 | 12/2014 | Moritz et al. |
| 9,628,510 B2 | 4/2017 | O'Hara |
| 9,894,578 B1 | 2/2018 | Jawaharlal et al. |
| 10,148,513 B1 | 12/2018 | Narayanam et al. |
| 10,819,739 B2 | 10/2020 | Williamson et al. |
| 2015/0310492 A1 | 10/2015 | Zewin et al. |
| 2021/0084067 A1* | 3/2021 | Smith ..................... H04L 45/22 |
| 2023/0130152 A1* | 4/2023 | Karia ............... H04M 3/42042 |
| | | 379/142.06 |

OTHER PUBLICATIONS

Seyghaly et al.,, "An Edge-based Strategy for Smart Advertising," In2021 International Conference on Computer Communications and Networks (ICCCN), Jul. 19, 2021,pp. 1-8, IEEE.

Drosou et al., "Preference-aware publish/subscribe delivery with diversity," InProceedings of the Third ACM International Conference on Distributed Event-Based Systems, Jul. 6, 2009, pp. 1-12.

Singanamalla et al., "Telechain: Bridging Telecom Policy and Blockchain Practice," InACM SIGCAS/SIGCHI Conference on Computing and Sustainable Societies (COMPASS), Jun. 29, 2022, pp. 280-299.

Singh et al., "Zero Knowledge Proofs Towards Verifiable Decentralized AI Pipelines," InFinancial Cryptography and Data Security: 26th International Conference, FC 2022, Grenada, May 2-6, 2022, Revised Selected Papers, Oct. 22, 2022, pp. 248-275. Cham: Springer International Publishing.

"The Telecom Commercial Communications Customer Preference Regulations," Gazette of India, Extraordinary, Part II, Section 4, Jul. 19, 2018, 113 pg.

* cited by examiner

100

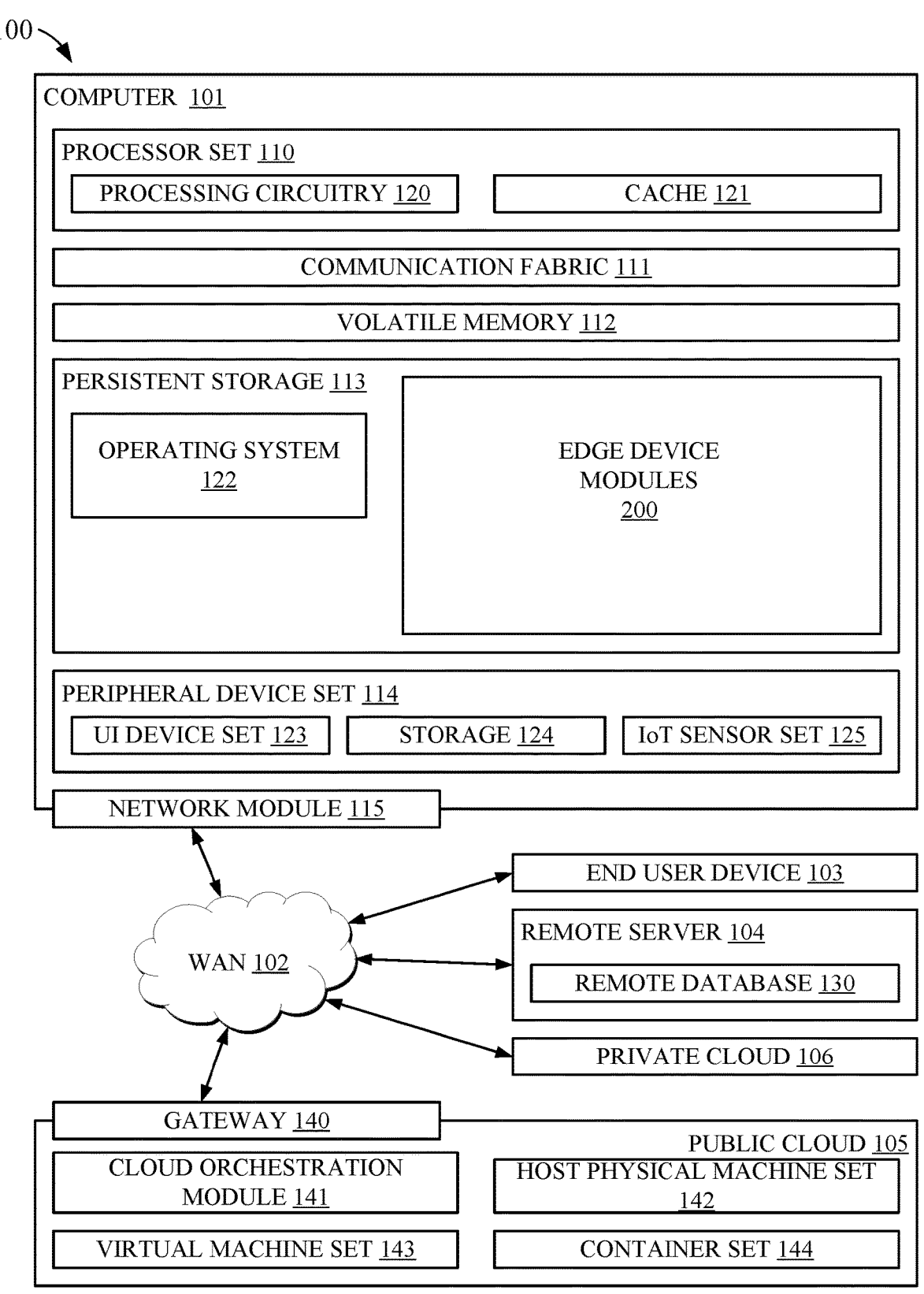

COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM
122

EDGE DEVICE
MODULES
200

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION
MODULE 141

HOST PHYSICAL MACHINE SET
142

VIRTUAL MACHINE SET 143          CONTAINER SET 144

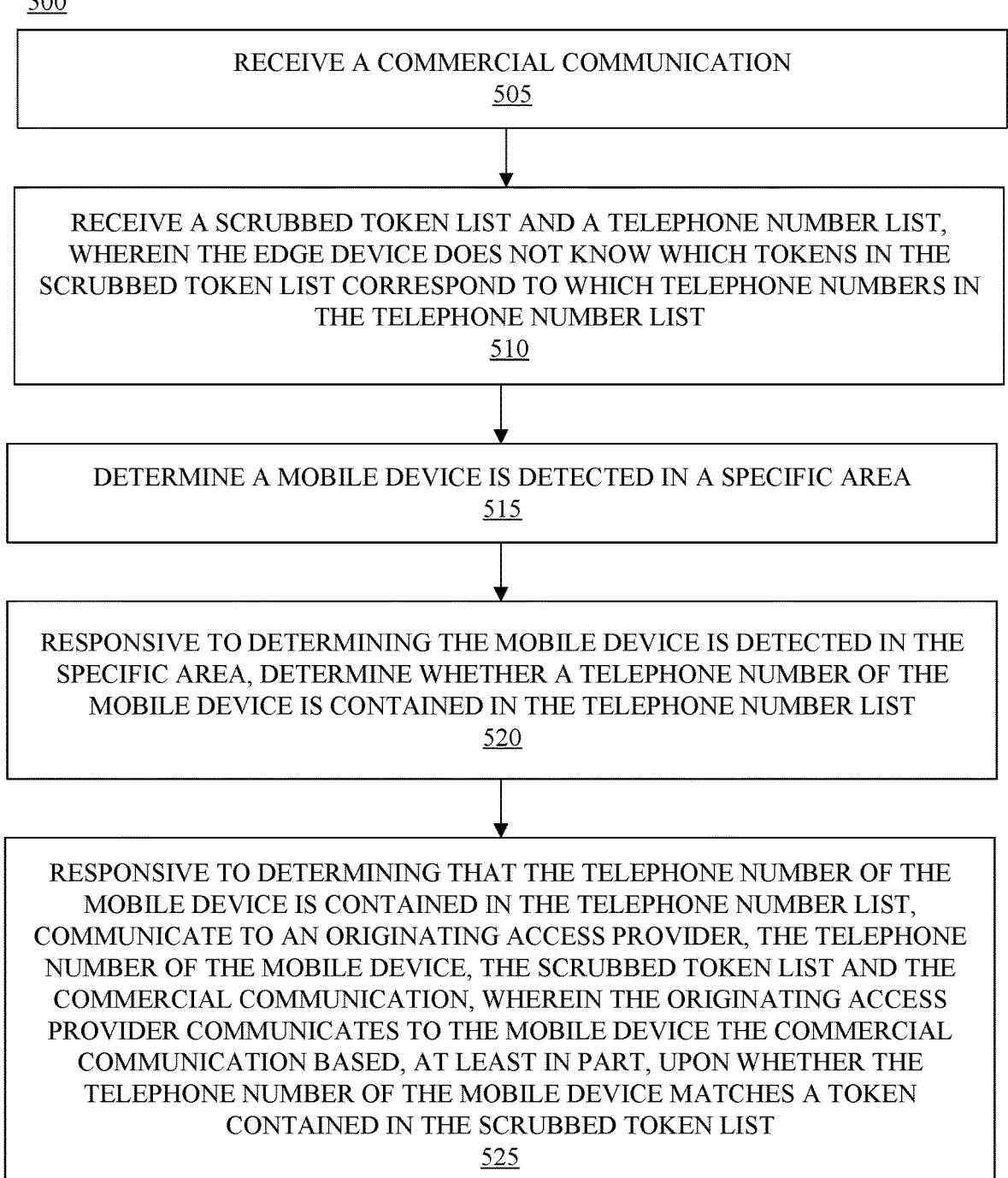

RECEIVE A COMMERCIAL COMMUNICATION
505

RECEIVE A SCRUBBED TOKEN LIST AND A TELEPHONE NUMBER LIST, WHEREIN THE EDGE DEVICE DOES NOT KNOW WHICH TOKENS IN THE SCRUBBED TOKEN LIST CORRESPOND TO WHICH TELEPHONE NUMBERS IN THE TELEPHONE NUMBER LIST
510

DETERMINE A MOBILE DEVICE IS DETECTED IN A SPECIFIC AREA
515

RESPONSIVE TO DETERMINING THE MOBILE DEVICE IS DETECTED IN THE SPECIFIC AREA, DETERMINE WHETHER A TELEPHONE NUMBER OF THE MOBILE DEVICE IS CONTAINED IN THE TELEPHONE NUMBER LIST
520

RESPONSIVE TO DETERMINING THAT THE TELEPHONE NUMBER OF THE MOBILE DEVICE IS CONTAINED IN THE TELEPHONE NUMBER LIST, COMMUNICATE TO AN ORIGINATING ACCESS PROVIDER, THE TELEPHONE NUMBER OF THE MOBILE DEVICE, THE SCRUBBED TOKEN LIST AND THE COMMERCIAL COMMUNICATION, WHEREIN THE ORIGINATING ACCESS PROVIDER COMMUNICATES TO THE MOBILE DEVICE THE COMMERCIAL COMMUNICATION BASED, AT LEAST IN PART, UPON WHETHER THE TELEPHONE NUMBER OF THE MOBILE DEVICE MATCHES A TOKEN CONTAINED IN THE SCRUBBED TOKEN LIST
525

FIG. 5

SCRUBBING FOR EDGE BASED COMMUNICATION OF COMMERCIAL COMMUNICATIONS

BACKGROUND

The present invention relates to communication systems, and more specifically, to mobile communications.

Mobile communications have become ubiquitous throughout much of the world. People commonly carry with them mobile devices (e.g., mobile telephones) used for telephony communication, text messaging and email communication. Thus, people can send and receive communications from virtually anywhere they travel.

SUMMARY

A method can include receiving, by an edge device, a commercial communication. The method can include receiving, by an edge device, a commercial communication. The method also can include receiving, by the edge device, a scrubbed token list and a telephone number list, wherein the edge device does not know which tokens in the scrubbed token list correspond to which telephone numbers in the telephone number list. The method also can include determining a mobile device is detected in a specific area. The method also can include, responsive to determining the mobile device is detected in the specific area, determining, by the edge device, whether a telephone number of the mobile device is contained in the telephone number list. The method also can include, responsive to determining that the telephone number of the mobile device is contained in the telephone number list, communicating, by the edge device to an originating access provider, the telephone number of the mobile device, the scrubbed token list and the commercial communication, wherein the originating access provider communicates to the mobile device the commercial communication based, at least in part, upon whether the telephone number of the mobile device matches a token contained in the scrubbed token list.

A system includes a processor programmed to initiate executable operations. The executable operations can include receiving, by an edge device, a commercial communication. The executable operations also can include receiving, by the edge device, a scrubbed token list and a telephone number list, wherein the edge device does not know which tokens in the scrubbed token list correspond to which telephone numbers in the telephone number list. The executable operations also can include determining a mobile device is detected in a specific area. The executable operations also can include, responsive to determining the mobile device is detected in the specific area, determining, by the edge device, whether a telephone number of the mobile device is contained in the telephone number list. The executable operations also can include, responsive to determining that the telephone number of the mobile device is contained in the telephone number list, communicating, by the edge device to an originating access provider, the telephone number of the mobile device, the scrubbed token list and the commercial communication, wherein the originating access provider communicates to the mobile device the commercial communication based, at least in part, upon whether the telephone number of the mobile device matches a token contained in the scrubbed token list.

A computer program product includes a computer readable storage medium having program code stored thereon. The program code is executable by a data processing system to initiate operations. The operations can include receiving, by an edge device, a commercial communication. The operations also can include receiving, by the edge device, a scrubbed token list and a telephone number list, wherein the edge device does not know which tokens in the scrubbed token list correspond to which telephone numbers in the telephone number list. The operations also can include determining a mobile device is detected in a specific area. The operations also can include, responsive to determining the mobile device is detected in the specific area, determining, by the edge device, whether a telephone number of the mobile device is contained in the telephone number list. The operations also can include, responsive to determining that the telephone number of the mobile device is contained in the telephone number list, communicating, by the edge device to an originating access provider, the telephone number of the mobile device, the scrubbed token list and the commercial communication, wherein the originating access provider communicates to the mobile device the commercial communication based, at least in part, upon whether the telephone number of the mobile device matches a token contained in the scrubbed token list.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

FIG. 1 is a block diagram illustrating an example of a network data processing system.

FIG. 5 is a flowchart illustrating an example of a method of communicating a commercial communication to a mobile device.

DETAILED DESCRIPTION

Figure 2:
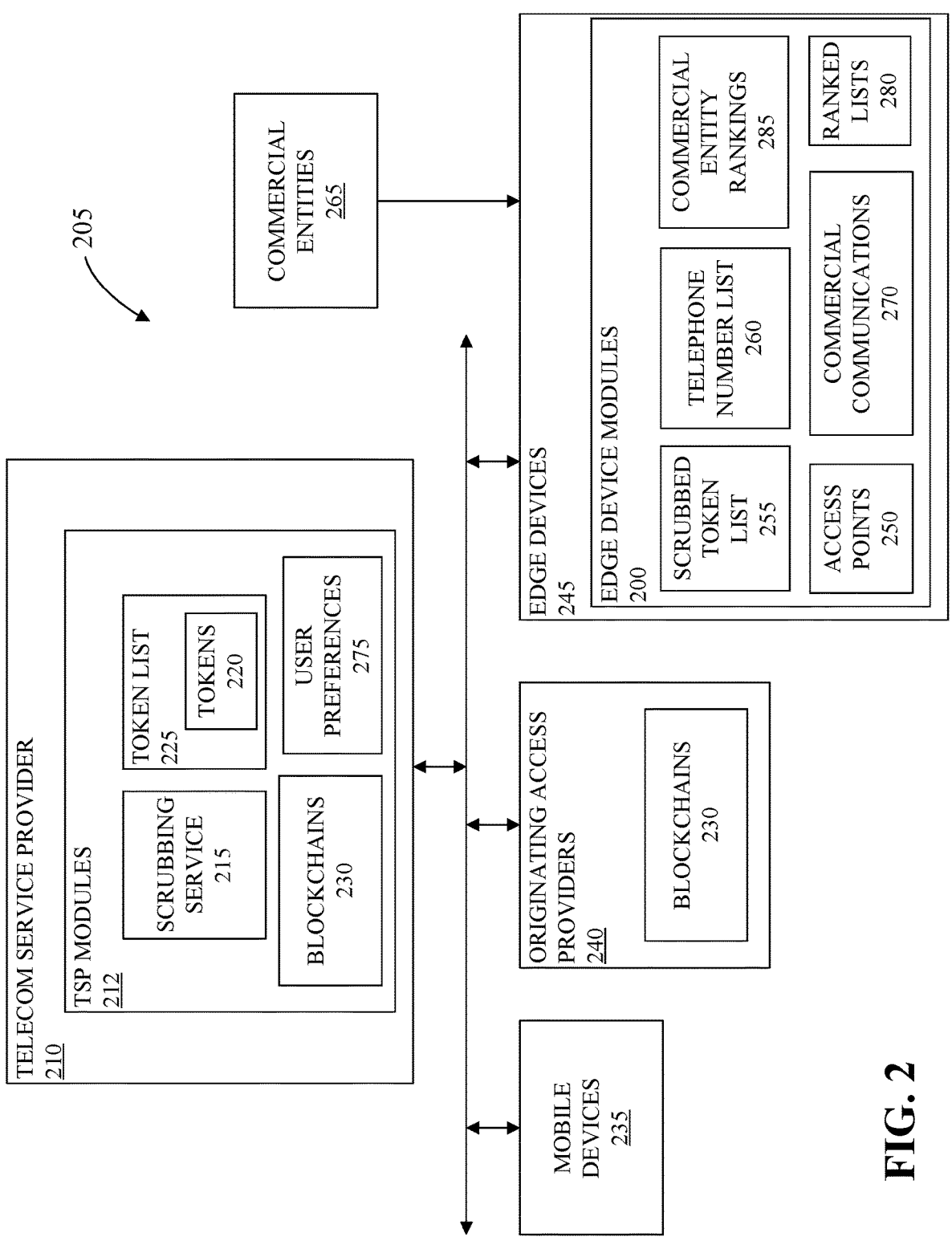
FIG. 2 is a block diagram illustrating example architecture for a mobile communication system.

The present invention relates to communication systems, and more specifically, to mobile communications.

The arrangements described herein are directed to computer technology, and provide an improvement to computer technology. Specifically, the present arrangements improve security and confidentiality of user private information in communication systems in which commercial communications are communicated to user mobile devices. In this regard, user preferences used to determine whether users allow for commercial communications to be sent to their mobile devices can be maintained by the users' telecom service provider, while still regulating communication of commercial communications to the users' mobile devices based on the user preferences, even while mobile devices roam to other originating access providers.

In this regard, the arrangements described herein provide proactive group scrubbing for timely delivery of commercial communications by edge device operators while ensuring individual consent data is not unintentionally shared nor leaked to the edge device operator. Further, the present arrangements enable on-demand verifiability of the charges levied by originating access providers for delivering commercial communications using scrubbed virtual tokens (hereinafter "tokens") without unintentionally sharing nor leaking private consent data. Further, the arrangements described herein use an edge device to share a commercial communication (e.g., a promotional message) with the user of a mobile device who has provided their consent to the telecom service provider for receiving such commercial communications.

Further, the present arrangements implement proactive scrubbing for groups of entities in order to route the relevant commercial communications to user mobile devices. The present arrangements also assign automatically generated tokens to telephone numbers. The tokens can be used by the telecom service provider to scrub against the users preference lists. Using the tokens, the telecom service provider can securely conduct proactive scrubbing for groups of commercial entities by the edge server without the edge server nor commercial entities getting exposed to any user preference information.

Further, arrangements described herein can prioritize and rank the commercial communications (e.g., promotional offers) at the edge device based on a user's proximity to a specific areas and user preference. In this regard, the scrubbing service described herein can optimize delivery of commercial communications based on user preferences and alter prioritization of commercial communications accordingly.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as edge device modules 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 is a block diagram illustrating example architecture 205 for a mobile communication system. Architecture 205 can include a telecom service provider (TSP) 210 hosting one or more computers that host TSP modules 212. Such computers can be equivalent to computer 100, but include TSP modules 212 rather than edge device modules 200. TSP modules 212 can include a scrubbing service 215 configured to generate a plurality of virtual tokens (hereinafter "tokens") 220 in a token list 225, and store the token list 225 in one or more blockchains 230. Each token 220 can be assigned to a telephone number of a respective mobile device 235. Thus, each token 220 can correspond to a single telephone number. A mobile device 235 can be, for example, a smart phone, a tablet computer, a laptop computer, smart glasses, a smart watch, or any other type of mobile communication device that may be assigned a telephone number. A token 220 can be a unique sequence of characters (e.g., numbers, letters and/or symbols). For example, a token 220 can be a unique hash value, a unique fake telephone number (e.g., a telephone number not assigned to a device), or any other unique sequence of characters. For each token 220, the token list 225 can comprise the token 220, the mobile number to which the token 220 is assigned, and a header. The header can be a string of characters assigned to the commercial entity 265 and can be unique to a particular commercial communication 270 communicated to one or more client devices, such as mobile device 235.

Scrubbing service 215 can communicate blockchains 230, including token list 225, to originating access providers (OAPs) 240. OAPs 240 can be other telecom service providers, implemented using computers, such as a computer using an architecture described for computer 101. For example, a mobile device 235 may subscribe to TSP 210, but may roam to another service area serviced by an OAP 240. Accordingly, other OAPs covering the service areas to which mobile devices 235 may roam can store a copy of blockchain 230 including token list 225.

Architecture 205 also can include a plurality of edge devices 245. An edge device 245 is hardware, comprising at least one processor and memory, that provides an entry point into an enterprise or service provider core network. An edge device 245 can be, for example, a computer 101 implemented as an edge server. Each edge device 245 can include edge device modules 200. In illustration, edge devices 245 can provide, for mobile devices 235, entry points to TSP 210 and OAPs 240. In this regard, each edge device 245 can include one or more access points 250 via which mobile device 235 may access edge devices 245, and thus access TSP 210 and/or OAPs 240. Scrubbing service 215 can scrub token list 225 to remove telephone numbers from token list 225, and communicate the scrubbed token list 255 to edge devices 245, for example as a hash of the scrubbed token list 255. Scrubbing service 215 also can communicate to edge devices 245 a telephone number list 260 comprising telephone numbers. The telephone number list 260 can include the telephone numbers removed from token list 225 to generate scrubbed token list 255, but with the order of telephone numbers can be shuffled (e.g., randomized) so that the order of the telephone numbers does not match the order of their corresponding tokens 220 in the scrubbed token list 255. Accordingly, edge devices 245 need not be able to (or cannot) compare scrubbed token list 255 to telephone number list 260 to determine which telephone numbers are assigned which tokens.

Edge devices 245 can be configured to be accessed by commercial entities 265 to provide commercial communications 270 (e.g., promotions, coupons, messages, etc.) to be communicated to mobile devices 235 for which such commercial communications 270 are authorized. In illustration, TSP modules 212 can include user preferences 275. Users of mobile devices 235 can set their user preferences 275 to indicate types of commercial communications 270 users choose to receive on their mobile devices 235, permitted communication modes for receiving commercial communications 270, suitable times (e.g., times of day, days of week, etc.) for receiving such commercial communications 270, and so on. For example, users can specify categories of products/services for which commercial communications 270 are authorized, companies/brands for which commercial communications 270 are authorized, and so on. Users also can block commercial communications 270 for certain types, categories and/or brands, block commercial communications 270 at certain times, block commercial communications 270 communicated via one or more certain communication modes (e.g., phone call, voice mail, popup message, etc.), or even completely block commercial communications 270. Commercial communications 270 can be provided as text messages (e.g., SMS messages), e-mail messages, popup messages, content presented in one or more mobile applications, voice messages, voice calls, and so on. By way of example, a commercial communication 270 can comprise a coupon presented in a particular mobile application, and that mobile application can generate an alert responsive to receiving the coupon, thus alerting the user of the coupon being received and available.

Edge devices 245 can generate ranked lists 280 of commercial entities 265 for mobile devices 235 based, at least in part, on commercial entity rankings 285 stored by edge devices 245. Commercial entity rankings 285 can rank commercial entities 265 based on one or more parameters. Such parameters can include, but are not limited to, parameters indicating popularity of commercial entities 265 among users of mobile devices 235. For a particular mobile device 235, an edge device 245 can determine a ranked list 280 based on commercial entity rankings 285. Edge device 245 can execute an algorithm that determines ranked list 280 for that mobile device 235 based on commercial entity rankings 285.

Figure 3:
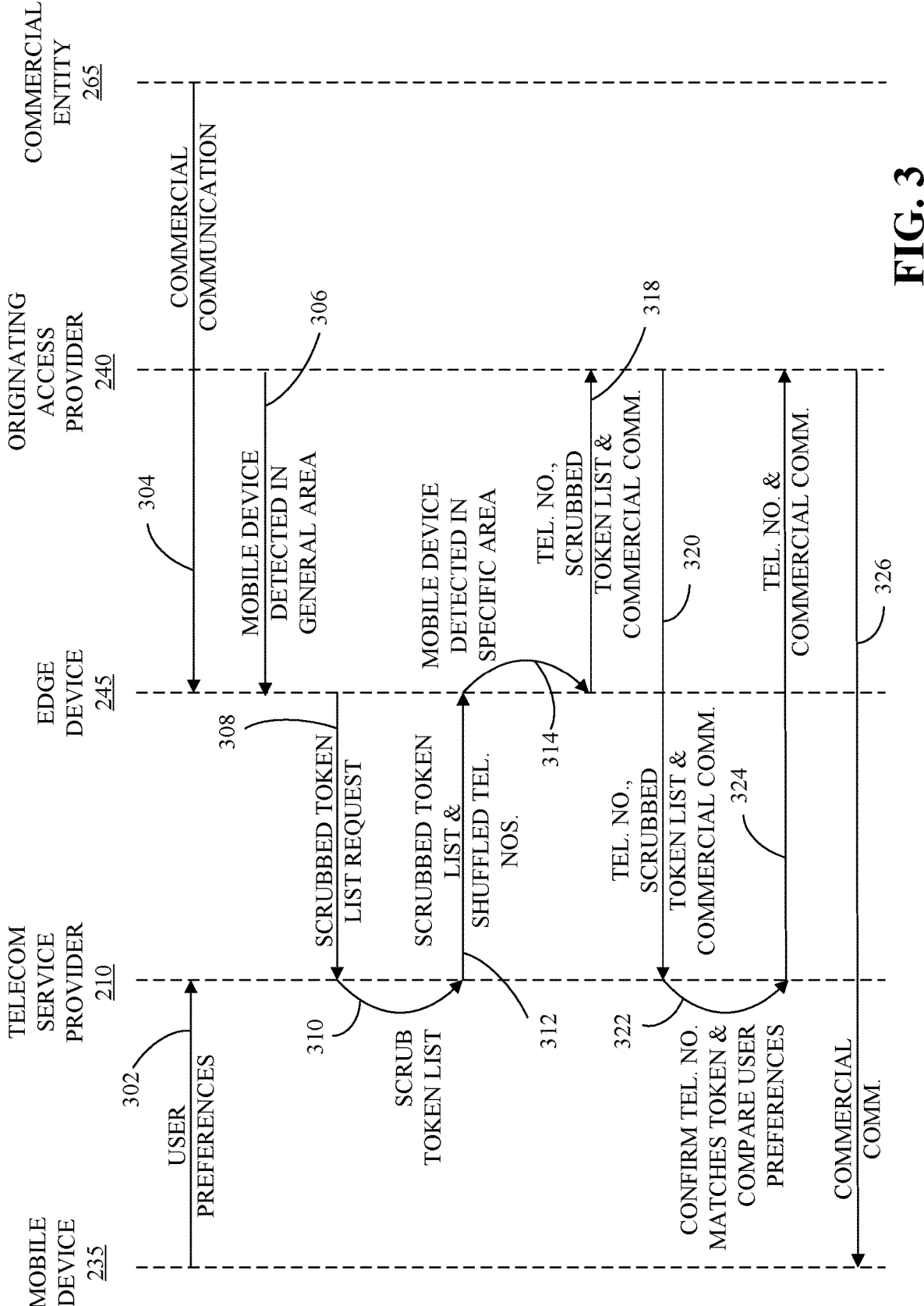
FIG. 3 is a flow diagram illustrating example communications among components of the mobile communication system of FIG. 2

FIG. 3 is a flow diagram illustrating example communications among certain components of the mobile communication system of FIG. 2. The process described for FIG. 2 can be performed for any number of, and any combination of, TSPs 210, mobile devices 235, OAPs 240, edge devices 245 and commercial entities 265.

At step 302, using mobile device 235, a user can set user preferences 275 for that user and/or for that mobile device 235. The user preferences 275 can comprise preferences for receiving commercial communications, for example as previously described.

At step 304, commercial entity 265 can communicate to edge device 245 commercial communication 270. In addition, commercial entity 265 can specify parameters pertaining to commercial communication 270. Such parameters can include, but are not limited to, parameters that specify when commercial communication 270 is to be communicated to mobile devices 235, parameters specifying a geographic region for mobile devices 235 targeted to receive commercial communication 270 (e.g., within a specific area, such as within threshold distance of a store), parameters specifying a type of product/service, a category of product/service, a brand of product/service to which commercial communication 270 pertains, and so on.

In one or more non-limiting arrangements, commercial entity 265 can specify one or more OAPs 240 via which commercial communication 270 is to be communicated. Accordingly, communication of that commercial communication 270 can be limited to the specified OAP(s) 240.

In illustration, commercial entity 265 can be a store in a shopping mall, edge device 245 can be maintained by the shopping mall, and commercial communication 270 can be a coupon or other promotion to be communicated to mobile devices 235 when mobile devices 235 are within a threshold distance from the store and/or to be communicated to mobile devices 235 within a certain time frame. For example, if the store is a restaurant, commercial communication 270 can be a coupon that is communicated to mobile devices 235 that are within 25 meters of the restaurant between 11:30 A.M. and 1:00 P.M.

At step 306 OAP 240 can detect mobile device 235 in a general area and communicate to edge device 245 information indicating that mobile device 235 is detected in the general area. The information can include, for example, a telephone number assigned to mobile device 235 and/or a media access control (MAC) address of mobile device 235. In illustration, OAP 240 can detect the location of the mobile device 235 using global positioning system (GPS) coordinates of mobile device 235 communicated by mobile device 235 to OAP 240. In another example, OAP 240 can detect mobile device 235 roaming onto an access point in the general area.

In one or more arrangements, TSP 210 can detect mobile device 235 in the general area and communicate to edge device 245 information indicating that mobile device 235 is in the general area. Again, the information can include, for example, a telephone number assigned to mobile device 235 and/or a MAC address of mobile device 235. In illustration, TSP 210 can detect the location of the mobile device 235 using GPS coordinates of mobile device 235 communicated by mobile device 235 to TSP 210. In another example, TSP 210 can detect mobile device 235 roaming onto an access point in the general area.

A general area can be, for instance, an area that is subdivided into many smaller areas. For example, a shopping mall subdivided into a plurality of stores can be a general area. In another example, a building having a plurality of offices/rooms can be a general area.

At step 308 edge device 245 can communicate to TSP 210 a request for a scrubbed token list. Responsive to such request, at step 310 scrubbing service 215 can generate token list 225, and scrub token list 225 by removing telephone numbers from token list 225 to generate scrubbed token list 255. Scrubbed token list 255 can include a plurality of tokens 220 in random order, wherein each token 220 is assigned to a telephone number of a respective mobile device 235 in the general area.

At step 312, TSP 210 can communicate to edge device 214 a scrubbed token list 255 and a telephone number list. The telephone number list can include a plurality of telephone numbers, including the telephone number of the mobile device 235. The plurality of telephone numbers provided in a shuffled (e.g., random) order. Accordingly, edge device 245 need not know (e.g., does not know) to which telephone number each token 220 is assigned, and thus need not know (e.g., does not know) to which mobile device 235 each token 220 is assigned. In one or more arrangements, TSP 210 can add token list 225 to one or more blockchains 230. TSP 210 can communicate the one or more blockchains 230 to OAP 240, as well as other OAPs 240 that may provide mobile communication service in the general area.

At step 314 edge device 245 can detect mobile device 235 in a specific area, which is an area smaller than the general area. For example, the specific area can be specified to be an area contained in the general area, and the specific area can be specified to be within a threshold distance of a store, office, etc. In illustration, as mobile device 235 approaches a store, mobile device 235 can pass the threshold distance into the specific area, and edge device 245 can detect such circumstance.

In one or more arrangements, edge device 245 can monitor the location of mobile device 235 in the general area by monitoring roaming of mobile device 235 among access points 250 communicatively linked to edge device 245. In one or more arrangements, OAP 240 (or TSP 210) can communicate to edge device 245 GPS coordinates and telephone number of mobile device 235, for example at a periodic rate (e.g., every five seconds, every ten seconds, every thirty seconds, every minute, etc.). Based on the GPS coordinates, edge device 245 can track the location of mobile device 235. Further, edge device 245 can determine which OAP 240 is a primary OAP 240 for mobile device 235

Responsive to detecting mobile device 235 in the specific area, edge device 245 can determine whether the telephone number of mobile device 235 is contained in the telephone number list 260. If not, edge device 245 need not take further action with regard to mobile device 235. If, however, the telephone number of mobile device 235 is contained in the telephone number list 260, edge device 245 can determine whether a commercial communication 270 is applicable to the circumstance of mobile device 235 being in the specific area. In illustration, edge device 245 can determine whether parameters assigned to a commercial communication 270 specify that specific area and specify that the commercial communication 270 is to be communicated via the primary OAP 240 for the mobile device 235. If such parameters also specify a time frame for the commercial communication 270, edge device 245 can determine whether the current time is within the specified time frame. Still, if any other parameters pertaining whether to communicate the commercial communication 270 are specified, edge device 345 can determine whether those parameters are met.

Responsive to the parameters pertaining to sending of the commercial communication 270 being met, at step 318 edge device 245 can communicate to OAP 240 the telephone number of mobile device 235, scrubbed token list 255, and the commercial communication 270 for which the parameters are met. In response, at step 320 OAP 240 can communicate to TSP 210 the telephone number of mobile device 235, scrubbed token list 255, and commercial communication 270 for which the parameters are met.

At step 322 TSP 210 can confirm whether the telephone number corresponds to a token 220 contained in scrubbed token list 255. For example, TSP 210 can determine a token 220, in token list 225, that is assigned to the telephone number, and determine whether that token 220 is contained in the scrubbed token list 255. If so, TSP 210 can compare parameters assigned to commercial communication 270 to user preferences 275 of the user to whom the telephone number is assigned, and determined whether the commercial communication 270 complies with user preferences 275 for allowed commercial messages. In illustration, TSP 210 can determine whether commercial communication 270 is a type of commercial communication allowed, is for a brand for which commercial communications 270 are allowed, the current time is a time for which commercial communication 270 is allowed, and so on.

If the telephone number corresponds to a token 220 contained in token list 225, and that the token 220 contained in token list 225 matches a token contained in the scrubbed token list 255, and if commercial communication 270 complies with user preferences 275 for the user of mobile device 235, at step 324 TSP 210 can communicate to OAP 240 the telephone number for mobile device 235 and commercial communication 270. In one or more arrangements, rather than communicating the telephone number for mobile device 235, TSP 210 can communicate to OAP 240 the token 220 assigned to the telephone number. OAP 240 can access blockchain 230 to select the telephone number based on the token 220. Regardless of how OAP 240 determines the telephone number, using the telephone number, at step 326 OAP 240 can communicate the commercial message to mobile device 235. In one or more arrangements, OAP 240 can communicate the commercial message to a terminating access provider (TAP) to which mobile device 235 subscribes, and the TAP can communicate the commercial message to mobile device 235.

Figure 4:
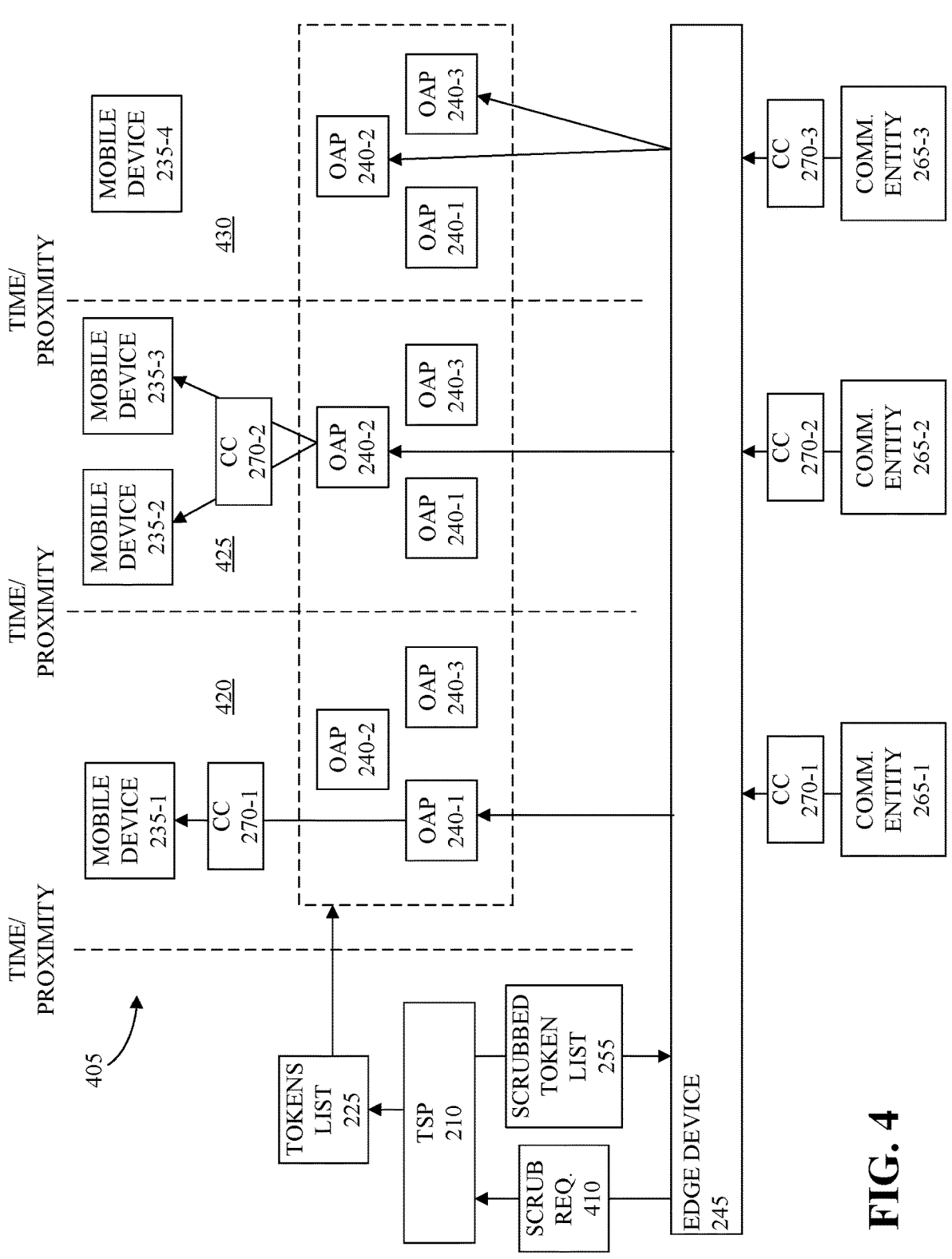
FIG. 4 is a block diagram illustrating example communications among components of the mobile communication system of FIG. 2

FIG. 4 is a block diagram illustrating example communications among components of the mobile communication system of FIG. 2. In this example, a plurality of mobile devices 235-1, 235-2, 235-3, 235-4 can be in a general area 405 (e.g., a shopping mall, shopping plaza, office building, etc.).

Edge device 245 can be assigned to the general area 405. Edge device 245 can communicate a scrubbed token request 410 to TSP 210. In response, TSP 210 can communicate to edge device 245 scrubbed token list 255. TSP 210 also can communicate token list 225 to OAPs 240, for example in a blockchain.

A plurality of commercial entities 365-1, 365-2, 365-3 each can communicate one or more respective commercial communications 270 to edge device 245. For example, commercial entity 365-1 can communicate a commercial communications 270-1 to edge device 245, commercial entity 365-2 can communicate a commercial communications 270-2 to edge device 245, and commercial entity 365-3 can communicate a commercial communications 270-3 to edge device 245. Each commercial entity 265 can specify one or more OAPs 240 that are to be used to communicate its respective commercial communication 270. For example, commercial entity 265-1 can specify that commercial communication 270-1 is to be communicated via OAP 240-1 (e.g., to mobile devices 235 registered with OAP 240-1). Similarly, commercial entity 265-2 can specify that commercial communication 270-2 is to be communicated via OAP 240-2. Commercial entity 265-3 can specify that commercial communication 270-3 is to be communicated via OAP 240-2 and OAP 240-3. Edge device 245 and/or OAPs 240 may levy charges to commercial entities for use of OAPs 240 to communicate commercial communications 270.

In this example, assume mobile device 235-1 is registered with OAP 240-1, is located within a specific region 420 specified for commercial communication 270-1 and within a time period specified for commercial communication 270-1. Also assume that user preferences 275 of the user of mobile device 235-1 allow for commercial communications from commercial entity 265-1. In response, edge device 245 can initiate communication of commercial communication 270-1 to mobile device 235-1 via OAP 240-1, for example as previously described. In some instances, mobile device 235-1 may be located within overlapping specific regions 420, 425. Edge device 245 can determine to which commercial entity 265 mobile device 235-1 is closest, and prioritize commercial communication 270-1 over commercial communication 270-2. For example, Edge device 245 can first initiate communication of commercial communication 270-1 to mobile device 235-1, and at a later time initiate communication of commercial communication 270-2 to mobile device 235-1.

Edge device 245 and/or OAP 240-1 can levy a charge against commercial entity 265-1 for delivery of commercial communication 270-1 using scrubbed token list 255 in accordance with arrangements described herein.

In another example, assume mobile devices 235-2, 235-3 are registered with OAP 240-2, are located within a specific region 425 specified for commercial communication 270-2 and within a time period specified for commercial communication 270-2. Also assume that user preferences 275 of the users of mobile devices 235-2, 235-3 allow for commercial communications from commercial entity 265-2. In response, edge device 245 can initiate communication of commercial communication 270-2 to mobile device 235-2, 235-3 via OAP-2, for example as previously described. Edge device 245 and/or OAP 240-2 can levy a charge against commercial entity 265-2 for delivery of commercial communication 270-2 using scrubbed token list 255 in accordance with arrangements described herein.

In a further example, assume mobile device 235-4 is registered with OAP 240-2 and OAP 240-3, is located within a specific region 430 specified for commercial communication 270-3 and within a time period specified for commercial communication 270-3. Assume, however, that user preferences 275 of the user of mobile device 235-4 do not allow for commercial communications from commercial entity 265-3. Thus, even though mobile device 235-4 satisfies the location and temporal requirements to receive commercial communication 270-3, based on the user preferences 275, commercial communication 270-3 will not be communicated to mobile device 235-4. Since commercial communication 270-3 is not communicated to mobile device 235-4, charges need not be levied against commercial entity 265-3, at least until commercial communication 270-3 is actually communicated to a mobile device 235 for which user preferences 275 authorize the commercial communication 270-3.

By way of further example, let $S=\{S\_1, \ldots, S\_n\}$ be the n commercial entities registered for pushing commercial communications with an edge device in a given general location (e.g., shopping mall, airport, etc.). Let $D\_i$ be a message header to be used for sending the commercial communication by commercial entity $S\_i$. A plurality of mobile devices 235 entering the general location within timeslot t in $[t\_1, t\_2]$. A request for proactive scrubbing can be generated by edge device 245 to receive scrubbed token list 255, wherein each token 220 corresponds to a particular telephone number. Let $(V\_j, m\_j)$ be the telephone number and token generated for mobile device j. Note that token 220 can be generated even if the user of mobile device j has provided consent to receive any commercial communications 270 from commercial entities 265. The scrubbed token list 255 and the telephone number list 260 can be communicated to the edge device 245.

Token list 225 can shared with the respective OAPs 240 used by commercial entities 265 to communicate commercial communications. Also, a hash of this data can shared with edge device 245. Note, however, that individual user preferences 275 and consent of users is not leaked to edge device 245.

Whenever a mobile device 235, and thus a user, is near the vicinity of edge device at a specific area, a commercial entity 265 registered for that specific area is identified and the telephone number of the mobile device 235 is identified by edge device 245.

If the telephone number is in the telephone number list 260, edge device 245 can send the scrubbed token list 255, telephone number of the mobile device 235, and the selected commercial communication 270 to the OAP(s) 240 used by the commercial entity 265. Note that the tokens can be shared to ensure edge device 245 has performed scrubbing for the user. Edge device 245 also can send to OAP(s) 240 a ranked list 280 of commercial entities 265 for mobile device 235. OAP(s) 240 can determine which commercial communication(s) 270 to communicate to mobile device 235 based, at least in part, on the ranked list 280 of commercial entities 265. For example, if multiple commercial entities have requested that commercial communications be sent to mobile devices 235 (e.g., subscribers), edge device 245 can send a ranked list 280 of the commercial entities 265 to OAP 240, which can send one or more commercial communications 270 to mobile devices 235 in accordance with the ranked list 280 of commercial entities 265. The rankings in the ranked list can be a resolution of a commercial entity ranking by edge device 245 with a preference ranking set by the user of mobile device 235. TSP 210 can determine the preference ranking based on user preferences 275.

TSP 210 can retrieve a token 220 for the given telephone number and determine whether that token is in the scrubbed token list 255 list provided by edge device 245. This can ensure that scrubbing has been performed. TSP 210 also can ensure the commercial communication 270 that is sent adheres to a message header and template. If so, the commercial communication 270 can be delivered to the mobile device 235 via OAP 240. Periodically each OAP 240 can communicate to edge device 245 or TSP 210 the total number of commercial communications 270 delivered on via edge device 245 for each commercial entity 265.

In some instances, an operator of edge device 245 may challenge an OAP 240 on charges for sending commercial communications 270 over a specific period. OAP 240 may want to convince operator of edge device 245 that charges computed were correct, without releasing any sensitive information. By way of example, let R be a requests sent to OAP 240 by the operator of edge device 245 during the period.

The following is a proof generation which OAP 240 may use to verify charges: Let $H\_1, H2, \ldots, H\_k$ be the hashes of the data $D\_1, D\_2, \ldots D\_k$ shared with OAP 240 after the scrubbing process during the given period. OAP 240 can concatenate the data to D and generate a column-wise hash for the concatenated dataset. OAP 240 also can generate a zero-knowledge proof to show that the concatenated data D was filtered as per the request shared by OAP 240 and then aggregate count of commercial communications 270 delivered computed correctly.

The following is a proof of verification that can be used by the operator of edge device 245: Operator of edge device 245 can verify the charges for a given period by using the hash of the data and the zero-knowledge proof submitted by the OAP 240.

FIG. 5 is a flowchart illustrating an example of a method 500 of communicating a commercial communication to a mobile device. The method can be implemented by edge device 245.

At step 505 edge device 245 can receive a commercial communication.

At step 505 edge device 245 can receive a scrubbed token list and a telephone number list, wherein the edge device does not know which tokens in the scrubbed token list correspond to which telephone numbers in the telephone number list.

At step 515 edge device 245 can determine a mobile device is detected in a specific area.

At step 520 edge device 245 can, responsive to determining the mobile device is detected in the specific area, determine whether a telephone number of the mobile device is contained in the telephone number list.

At step 525 edge device 245 can, responsive to determining that the telephone number of the mobile device is contained in the telephone number list, communicate to an originating access provider, the telephone number of the mobile device, the scrubbed token list and the commercial communication, wherein the originating access provider communicates to the mobile device the commercial communication based, at least in part, upon whether the telephone number of the mobile device matches a token contained in the scrubbed token list The foregoing description is just an example of embodiments of the invention, and variations and substitutions. While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As defined herein, the term "general area" means a geographic region comprising a plurality of specific areas. For example, a general area can be a shopping center, a shopping mall, an office building, etc.

As defined herein, the term "specific area" means a geographic region within a general area and that is smaller than the general area. For example, a specific area can be an area within a store or office and/or within a threshold distance of the store or office.

As defined herein, the term "telecom service provider" means a provider of telecom services to mobile devices.

As defined herein, the term "originating access provider" means a telecom service provider that provides telecom resources to a commercial entity that communicates commercial communications.

As defined herein, the term "terminating access provider" means a telecom service provider that provides telecom resources to a mobile device. As defined herein, the term "commercial communication" means a text message or a voice message communicated to a mobile device to convey a commercial solicitation or advertisement.

As defined herein, the term "token" means a sequence of characters assigned to a telephone number.

As defined herein, the term "token list" means a list comprising tokens and telephone numbers to which the tokens are assigned, the token list indicating which tokens are assigned to which telephone numbers.

As defined herein, the term "scrubbed token list" means a token list from which the telephone numbers have been removed, or the indications of which tokens are assigned to which telephone numbers have been masked or removed.

As defined herein, the term "edge device" means a hardware system comprising at least one processor and memory, that provides an entry point into an enterprise or service provider core network. An example of an edge device is an edge server.

As defined herein, the term "blockchain" means a distributed ledger comprising immutable records used for tracking tokens assigned to telephone numbers.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "data processing system" means one or more hardware systems configured to process data, each hardware system including at least one processor programmed to initiate executable operations and memory.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "server" means a data processing system configured to share services with one or more other data processing systems.

As defined herein, the term "mobile device" means a mobile data processing system that is assigned a telephone number. Examples of a mobile device include, but are not limited to, a smart phone, a tablet computer, a personal digital assistant, a smart watch, smart glasses, a mobile computer, a laptop computer, a netbook computer, a gaming device, and the like. Network infrastructure, such as routers, firewalls, switches, access points and the like, are not mobile devices as the term "mobile device" is defined herein.

As defined herein, the term "real time" means a level of processing responsiveness that a user or system senses as sufficiently immediate for a particular process or determination to be made, or that enables the processor to keep up with some external process.

As defined herein, the term "output" means storing in memory elements, writing to display or other peripheral output device, sending or transmitting to another system, exporting, or similar operations.

As defined herein, the term "automatically" means without user intervention.

As defined herein, the term "user" means a person (i.e., a human being).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving, by an edge device, a commercial communication;
receiving, by the edge device, a scrubbed token list and a telephone number list, wherein
the scrubbed token list is generated by a telecom service provider by removing telephone numbers from a token list that includes tokens corresponding to the telephone numbers, and
based on the removing of the telephone numbers from the token list, a correspondence between the tokens in the scrubbed token list and the telephone numbers in the telephone number list is hidden from the edge device;
tracking, by the edge device, a location of a mobile device, wherein the tracking is based on at least one of:
roaming of the mobile device among a plurality of access points communicatively linked to the edge device, or
receiving of global positioning system (GPS) coordinates and a telephone number of the mobile device from an originating access provider at a periodic rate;
detecting, based on the tracking, that the GPS coordinates associated with the location of the mobile device correspond to a specific area;
based on the detecting that the GPS coordinates associated with the location of the mobile device correspond to the specific area, determining, by the edge device, whether the telephone number of the mobile device is contained in the telephone number list; and
based on the determining that the telephone number of the mobile device is contained in the telephone number list, communicating, by the edge device to the originating access provider, the telephone number of the mobile device, the scrubbed token list, and the commercial communication, wherein
the originating access provider communicates to the mobile device the commercial communication based, at least in part, on whether the telephone number of the mobile device matches a token contained in the scrubbed token list.

2. The computer-implemented method of claim 1, further comprising:
detecting that the mobile device is in a general area, wherein the specific area is within the general area; and
based on the detecting that the mobile device is in the general area, communicating by the edge device to the telecom service provider a request for the scrubbed token list,
wherein the receiving, by the edge device, the scrubbed token list and the telephone number list is based on the communicating, by the edge device to the telecom service provider, the request for the scrubbed token list.

3. The computer-implemented method of claim 1, wherein
the originating access provider communicates, to the telecom service provider, the telephone number of the mobile device and the scrubbed token list, wherein the telecom service provider determines whether the telephone number of the mobile device matches the token contained in the scrubbed token list.

4. The computer-implemented method of claim 3, wherein
the originating access provider further communicates to the telecom service provider the commercial communication,
based on the telecom service provider determining that the telephone number of the mobile device matches the token contained in the scrubbed token list, the telecom service provider communicates to the originating access provider the telephone number of the mobile device and the commercial communication, and
the originating access provider further communicates to the mobile device the commercial communication based on receiving, from the telecom service provider, the telephone number of the mobile device and the commercial communication.

5. The computer-implemented method of claim 1, wherein the originating access provider communicates to the mobile device the commercial communication based, at least in part, on user preferences of a user of the mobile device.

6. The computer-implemented method of claim 1, further comprising:

communicating, by the edge device to the originating access provider, a ranked list of commercial entities, wherein the originating access provider communicates to the mobile device the commercial communication based, at least in part, on the ranked list of commercial entities.

7. The computer-implemented method of claim 1, further comprising detecting, by the edge device, that the GPS coordinates, associated with the location of the mobile device, correspond to the specific area.

8. A system, comprising:

a processor configured to initiate executable operations comprising:

receiving, by an edge device, a commercial communication;

receiving, by the edge device, a scrubbed token list and a telephone number list, wherein the scrubbed token list is generated by a telecom service provider by removing telephone numbers from a token list that includes tokens corresponding to the telephone numbers, and based on the removing of the telephone numbers from the token list, a correspondence between the tokens in the scrubbed token list and the telephone numbers in the telephone number list is hidden from the edge device;

tracking, by the edge device, a location of a mobile device, wherein the tracking is based on at least one of:

roaming of the mobile device among a plurality of access points communicatively linked to the edge device, or receiving of global positioning system (GPS) coordinates and a telephone number of the mobile device from an originating access provider at a periodic rate;

detecting, based on the tracking, that the GPS coordinates, associated with the location of the mobile device, correspond to a specific area;

based on the detecting that the GPS coordinates associated with the location of the mobile device correspond to the specific area, determining, by the edge device, whether the telephone number of the mobile device is contained in the telephone number list; and based on the determining that the telephone number of the mobile device is contained in the telephone number list, communicating, by the edge device to the originating access provider, the telephone number of the mobile device, the scrubbed token list, and the commercial communication, wherein the originating access provider communicates to the mobile device the commercial communication based, at least in part, on whether the telephone number of the mobile device matches a token contained in the scrubbed token list.

9. The system of claim 8, wherein the executable operations further comprise:

detecting that the mobile device is in a general area, wherein the specific area is within the general area; and based on the detecting that the mobile device is in the general area, communicating by the edge device to the telecom service provider a request for the scrubbed token list, wherein the receiving, by the edge device, the scrubbed token list and the telephone number list is based on the communicating, by the edge device to the telecom service provider, the request for the scrubbed token list.

10. The system of claim 8, wherein the originating access provider communicates, to the telecom service provider, the telephone number of the mobile device and the scrubbed token list, wherein the telecom service provider determines whether the telephone number of the mobile device matches the token contained in the scrubbed token list.

11. The system of claim 10, wherein the originating access provider further communicates to the telecom service provider the commercial communication, based on the telecom service provider determining that the telephone number of the mobile device matches the token contained in the scrubbed token list, the telecom service provider communicates to the originating access provider the telephone number of the mobile device and the commercial communication, and the originating access provider further communicates to the mobile device the commercial communication based on receiving, from the telecom service provider, the telephone number of the mobile device and the commercial communication.

12. The system of claim 8, wherein the originating access provider communicates to the mobile device the commercial communication based, at least in part, on user preferences of a user of the mobile device.

13. The system of claim 8, wherein the executable operations further comprise:

communicating, by the edge device to the originating access provider, a ranked list of commercial entities, wherein the originating access provider communicates to the mobile device the commercial communication based, at least in part, upon the ranked list of commercial entities.

14. The system of claim 8, wherein the executable operations further comprise detecting, by the edge device, that the GPS coordinates, associated with the location of the mobile device, correspond to the specific area.

15. A computer program product, comprising:

one or more computer readable storage mediums having program code stored thereon, the program code stored on the one or more computer readable storage mediums collectively executable by a data processing system to initiate operations comprising:

receiving, by an edge device, a commercial communication;

receiving, by the edge device, a scrubbed token list and a telephone number list, wherein the scrubbed token list is generated by a telecom service provider by removing telephone numbers from a token list that includes tokens corresponding to the telephone numbers, and based on the removing of the telephone numbers from the token list, a correspondence between the tokens in the scrubbed token list and the telephone numbers in the telephone number list is hidden from the edge device;

tracking, by the edge device, a location of a mobile device, wherein the tracking is based on at least one of:

roaming of the mobile device among a plurality of access points communicatively linked to the edge device, or receiving of global positioning system (GPS) coordinates and a telephone number of the mobile device from an originating access provider at a periodic rate;

detecting, based on the tracking, that the GPS coordinates associated with the location of the mobile device correspond to a specific area;

based on the detecting that the GPS coordinates associated with the location of the mobile device correspond to the specific area, determining, by the edge device, whether the telephone number of the mobile device is contained in the telephone number list; and based on the determining that the telephone number of the mobile device is contained in the telephone number list, communicating, by the edge device to the originating access provider, the telephone number of the mobile device, the scrubbed token list, and the commercial communication, wherein the originating access provider communicates to the mobile device the commercial communication based, at least in part, on whether the telephone number of the mobile device matches a token contained in the scrubbed token list.

16. The computer program product of claim 15, wherein the operations further comprise:

detecting that the mobile device is in a general area, wherein the specific area is within the general area; and based on the detecting that the mobile device is in the general area, communicating by the edge device to the telecom service provider a request for the scrubbed token list, wherein the receiving, by the edge device, the scrubbed token list and the telephone number list is based on the communicating, by the edge device to the telecom service provider, the request for the scrubbed token list.

17. The computer program product of claim 15, wherein the originating access provider communicates, to the telecom service provider, the telephone number of the mobile device and the scrubbed token list, wherein the telecom service provider determines whether the telephone number of the mobile device matches the token contained in the scrubbed token list.

18. The computer program product of claim 17, wherein the originating access provider further communicates to the telecom service provider the commercial communication, based on the telecom service provider determining that the telephone number of the mobile device matches the token contained in the scrubbed token list, the telecom service provider communicates to the originating access provider the telephone number of the mobile device and the commercial communication, and the originating access provider further communicates to the mobile device the commercial communication based on receiving, from the telecom service provider, the telephone number of the mobile device and the commercial communication.

19. The computer program product of claim 15, wherein the originating access provider communicates to the mobile device the commercial communication based, at least in part, on user preferences of a user of the mobile device.

20. The computer program product of claim 15, wherein the the operations further comprise:

communicating, by the edge device to the originating access provider, a ranked list of commercial entities, wherein the originating access provider communicates to the mobile device the commercial communication based, at least in part, on the ranked list of commercial entities.

* * * * *